United States Patent Office 3,404,092
Patented Oct. 1, 1968

3,404,092
POLYMERS CONTAINING URETHANE GROUPS AS MULTIFUNCTIONAL V.I. IMPROVERS
Norman Jacobson, East Brunswick, N.J., and Herbert Takashima, New York, N.Y., assignors to Esso Research and Engineering Company, a corporation of Delaware
No Drawing. Filed Mar. 21, 1966, Ser. No. 535,744
6 Claims. (Cl. 252—51.5)

ABSTRACT OF THE DISCLOSURE

V.I. improvers exhibiting improved thickening potencies and shear stabilities in petroleum oils are produced by reacting a hydroxylated, degraded copolymer with an organic isocyanate, such as a $C_{10}$–$C_{25}$ alkyl monoisocyanate. The hydroxylated copolymer is preferably a polymer of ethylene and a $C_3$–$C_{10}$ alpha olefin. Other polymers found useful include copolymers of ethylene with $C_3$–$C_5$ unsaturated esters, ethers or nitriles.

---

This invention relates to polymerization products of certain active hydrogen-containing hydrocarbon polymers, e.g. hydroxylated ethylene-alpha-olefin copolymers with an isocyanate which are suitable for use as additives in oleaginous compositions and, more particularly, relates to hydrocarbon oil compositions containing certain polymerization products of hydroxyl containing-copolymers of ethylene and alpha-olefins, especially ethylene and propylene with an aliphatic monoisocyanate as defined more fully. When added to oleaginous compositions, these polymerization products improve said compositions with respect to viscosity index while exhibiting thickening potencies and shear stabilities superior to conventional additives similarly employed.

An important property of an oleaginous composition is the rate at which its viscosity changes as a function of temperature. The relationship between the viscosity and temperature is commonly expressed in the art as the viscosity index (V.I.). Oleaginous compositions which change little in viscosity with variations in temperature have a greater viscosity index than do compositions whose viscosity is materially affected by changes in temperature. It is readily apparent, therefore, that one of the major requirements of lubricating oils or other hydrocarbon oil products is their satisfactory viscosity-temperature characteristics. These characteristics are necessary in order that the oils will not lose their fluidity but will show an equally good performance within a relatively wide temperature range to which they may be exposed in service. The wider the possible temperature variations, the smaller should be the change in viscosity with temperature. Hence, the viscosity-temperature characteristics of a lubricant which is used in applications where wide variations in temperature are encountered are of great importance and lubricant compositions having high viscosity indices are highly desirable.

In refining natural petroleum oils or in preparing synthetic oils, it is economically feasible to improve their viscosity index only up to a certain maximum inasmuch as further treatment has only an additional negligible effect on viscosity index characteristics. Further marked improvement can be effected, however, by adding to said compositions various types of additives for viscosity index improvement. In raising the viscosity index of oleaginous compositions by additives, recourse has been made to the introduction of long-chain compounds of the nature of linear polymers; generally the highest V.I. increase being obtained from polymers of the greatest chain length. While such polymeric products have been generally satisfactory in V.I. improvement, there has, up to the instance of the present invention, been a limit to V.I. improvement without incurring concomitant limiting factors.

For example, besides the attainment of V.I. improvement, consideration must also be given to the solubility of the polymer additive in the base composition, as well as the additive stability against breakdown under shear stresses encountered in its application. In the synthesis of polymeric V.I. agents to date, it has generally been found that solubility and shear stability are inversely proportional to the molecular weight of the polymer. Since the greatest V.I. effect has been obtained from polymers of the highest molecular weight, effectiveness has, disadvantageously, been sacrificed in order to insure proper stability in respect to resistance against shear stresses and to attain the desired solubility of the additives. Thus, the V.I. improving characteristic of additives has been undesirably restricted by limitation of one of the aforementioned characteristics.

Another feature of V.I. improvers is the amount of additive necessarily utilized in order to attain the desired V.I. improvement. This measure of effectiveness of an additive, as reflected by the amounts utilized, may be referred to as the thickening potency of the additive. It is readily apparent, therefore, that in addition to effective V.I. improvement with accompanying shear stability, solubility, etc., it is highly desirable to prepare a V.I. improver which has a thickening potency such that smaller amounts of additive as compared to amounts conventionally employed can be utilized to attain the desired improvements.

Accordingly, it is an object of this invention to provide additives which improve the viscosity-temperature characteristics of oleaginous compositions. It is also an object of this invention to provide additives which improve the viscosity-temperature characteristics of oleaginous compositions and which further exhibit exemplary shear stabilities, thickening potencies, solubilities, etc. It is a further object of this invention to provide oleaginous compositions having improved viscosity-temperature characteristics. Another object is to provide lubricant compositions having improved viscosity indices. A further object of this invention is to provide lubricant compositions which exhibit superior properties, e.g., shear stability, thickening potency, solubility, etc., in addition to improved viscosity indices. Other objects and advantages of the invention will become apparent from the following description thereof.

In accordance with this invention, the above objects, among others, are achieved by incorporating into an oleaginous composition a soluble urethane, i.e. the reaction product of an active hydrogen containing compound, e.g. a so-modified ethylene-alpha-olefin copolymer, with a compound containing one or more isocyanate radicals, e.g. a monoisocyanate. In contrast to the detailed attention heretofore given to the improvement of oleaginous compositions as to viscosity index, pour depressant, etc. qualities through the use of hydrocarbon polymers, copolymers and terpolymers, the present invention is directed to the use of the reaction products of such polymers, copolymers and terpolymers with certain isocyanate containing materials. Accordingly, it has been discovered that polymeric materials such as ethylene-alpha-olefin, e.g. rubbery ethylene-propylene, copolymers and terpolymers, e.g. the ethylene-propylene-methylene norbornene terpolymer may be subjected to a controlled oxidation using molecular oxygen or a gas such as air which contains molecular oxygen, with or without the aid of substances which have heretofore been employed and are known as free radical initiators and may be subsequently reacted with an aliphatic monoisocyanate to form a urethane polymer which can be advantageously employed as an additive in oleaginous compositions. As will be hereinafter more fully described, a number of methods can be employed for finally producing the urethane polymer.

Broadly, the present invention contemplates any hydroxylated hydrocarbon polymer but is specifically directed to urethane polymers formed from copolymers of certain hydroxylated alpha-olefins and especially copolymers of ethylene and at least one alpha monoolefin said alpha-olefin having the structure R—CH=CH$_2$ where R is an alkyl radical, branched or unbranched, preferably unbranched, and preferably having not more than eight carbon atoms which has been reacted with an isocyanate compound, preferably an aliphatic monoisocyanate containing 14 to 20 carbon atoms.

Representative of the alpha-olefins of the ethylene-alpha-olefin copolymers, i.e. olefins having the structure R—CH=CH$_2$ wherein R is a C$_1$ to C$_8$ alkyl radical include: propylene; 1-butene; 4-methyl-1-pentene; 1-pentene; 1-hexene; 1-heptene; 1-octene; 1-nonene; 1-decene; 5-methyl-1-nonone; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; 5,6,6-trimethyl-1-heptene.

Conventionally, the ethylene-alpha-olefin copolymers are prepared using Friedel-Crafts type catalysts or using the Ziegler type catalysts. These reactions are well known and are conventionally employed. Accordingly, the present invention is not predicated upon the particular catalyst system employed in preparing the copolymer starting materials.

The copolymerization reaction of ethylene with at least one other olefinic monomer results in soluble copolymers in excess of 50 and up to about 500,000 viscosity average molecular weights is well-known. The catalytic systems, temperatures, pressures, reaction diluents, feedstock compositions and the like are described in detail in the prior art. The catalysts employed are complexes or mixtures of a reducing metal compound with a reducible metal compound. The preferred reducing metal compound is an organo aluminum compound having the general formula:

$$(R)_xAl(X)_y$$

where $x$ and $y$ are 1 or 2 and the sum of $x$ plus $y$ is 3, each R is a hydrogen atom, a C$_1$ to C$_6$ alkyl or aryl radical and X is a hydrogen or halogen atom or an alkoxy, aryloxy, secondary amino, amido, mercapto group, and the like. Specific examples of such aluminum compounds are: aluminum triethyl, aluminum trimethyl, aluminum triisopropyl, aluminum diethyl chloride, aluminum diethyl bromide, aluminum ethyl dichloride, aluminum ethyl dibromide, ethyl aluminum dihydride, diethyl aluminum hydride, ethoxy aluminum diethyl, aluminum diphenyl chloride, aluminum triphenyl and aluminum hydride. The preferred aluminum compounds are diethyl aluminum chloride and an admixture of diethyl aluminum chloride with ethyl aluminum dichloride.

The reducible metal compound is a compound of a metal selected from the group consisting of: IV–a, V–a, VI–a, and VII of the Periodic Chart of the Atoms as described by Henry D. Hubbard, 1956 revised edition. Such elements include: titanium, zirconium, hafnium, thorium, uranium, vanadium, tantalum, chromium, molybdenum, tungsten, iron, cobalt, nickel and the like. Examples of the compounds of these metals which may be used include the chlorides or bromides or oxychlorides or oxybromides, oxides and hydroxides, alcoholates, acetates and benzoates. The preferred salts are titanium tetrachloride, titanium oxychloride, vanadium tetrachloride and vanadium oxychloride. The catalyst mixture is prepared by simply mixing the aluminum compound with the reducible heavy metal compound in the presence of an inert organic reaction diluent. At least 1 mole of the metal compound having reducing properties is admixed per mole of reducible metal compound. Preferably the molar ratio of the reducing metal compound to the reducible metal compound is in the range of about 1.5:1 to about 6:1. A sufficient amount of this catalytic mixture is added so that about 0.2 and about 15 wt. percent of the catalyst components are present in the reaction mixture.

The polymerization reaction is carried out generally in the range of between about 60° and about 100° C. with agitation at atmospheric pressure or under superatmospheric pressures up to as high as 2,000 p.s.i.g. The time of reaction varies between about 0.2 and about 15 hours, preferably between about 0.5 and about 5 hours. The amounts of ethylene to alpha-olefin fed to the reaction may vary between about 15 mole percent to 85 mole percent alpha-olefin, preferably between about 30 mole percent and about 60 mole percent alpha-olefin.

In the case of the preparation of the terpolymers, the two monomeric feed components used in making the ethylene-propylene copolymer are usually employed and the same catalyst reaction conditions, etc. are employed. In addition, however, in the case of the terpolymer, a third unsaturated monomer, namely nonconjugated diolefin, is employed which may be one or more of the following: cyclopentadiene, 2-methylene-5-norbornene, a nonconjugated hexadiene, or any other alicyclic or aliphatic non-conjugated diolefin having from 6 to 15 carbon atoms per molecule such as 2-methyl norbornadiene, 2,4-dimethyl-2,7-octadiene, and 3-(2-methyl-1-propene) cyclopentene. The aforementioned terpolymers are also well known in the art. The amount of the third monomer present in the feed is usually within the range of between about 0.5 and about 20 mole percent, preferably between about 1 and about 7 mole percent, based on the total amount of ethylene and propylene present.

Both with regard to the copolymerization and terpolymerization reaction, the preferred reaction conditions involve the use of various solvents as the organic diluent and reaction medium. Various solvents may be used in the copolymer preparation and they include aliphatic, naphthenic, aromatic and halogenated hydrocarbon solvents, mineral oils, or an excess of the higher alpha-olefin such as propylene may be used. Examples of solvent include n-hexane, heptane, propane, cyclohexane, benzene, toluene, xylenes, tetrachloroethylene, Decalin and chlorobenzenes, preferably, n-hexane, and the like.

The use of a temperature of about 70° C., a pressure of about 60 p.s.i.g., a time of reaction of about 30 minutes: using 0.2 wt. percent in the reaction mixture of a catalyst composed of 1 mole of vanadium oxytrichloride and 4 moles of diethyl aluminum chloride. A typical feedstock in the case of the copolymerization reaction involves about 50 wt. percent of ethylene and about 50 wt. percent of propylene and in the case of a terpolymerization, about 48 wt. percent ethylene, about 48 wt. percent propylene, and about 4 wt. percent 2 - methylene - 5 - norbornene. Typically the copolymer has a viscosity average molecular weight of about 150,000 in which the range or distribution of molecular weight is, as mentioned, between about 50 and about 500,000. Typically a terpolymer, under these conditions, also has a viscosity average molecular weight of about 150,0000 with a molecular weight range distribution of between about 100,000 and about 500,000.

The ethylene monomer unit concentration in the copolymer ranges in general from about 20% to about 75% by weight, preferably 30% to 75% by weight. Copolymers having more concentrations of ethylene monomer units outside these ranges tend to be insoluble in lubricating oils, fuels and the like. The third monomer component generally comprise no more than 20% by weight of the terpolymer, i.e. about 0.5 to 20% by weight and preferably 1 to 7% by weight.

The present invention also contemplates, in addition to the above ethylene-alpha-olefin copolymers, the use of a copolymer of ethylene and an unsaturated aliphatic monomer, for example, a vinyl ester and particularly a vinyl acetate. The copolymer suitable for use in the present invention may comprise a copolymer of ethylene and up to about 50% by weight of an olefinically unsaturated aliphatic monomer containing from about 3 to about 5 carbon atoms per molecule and, preferably, a vinyl ester. In general, these compounds may comprise vinyl acetate, vinyl propionate, methyl methacrylate, allyl ethyl ether, divinyl ether, acrylonitrile and vinyl acetonitrile.

The preferred copolymer was an ethylene-vinyl acetate copolymer. It is preferred that the portion of ethylene in the copolymer should be in the range of from about 60% to 99% by weight and the proportion of vinyl acetate should be in the range of from about 40% to about 1% by weight. A very desirable polyethylene vinyl acetate copolymer contains about 5% to 25% by weight of vinyl acetate. The molecular weights of soluble ethylene-vinyl ester copolymers are in the range of from 50,000 to 1,000,000, preferably, in the range of from 75,000 to 400,000.

In accordance with this invention, the heretofore mentioned copolymers, for example, ethylene-propylene copolymers, or terpolymers, for example, the terpolymer of ethylene, propylene and methylene norbornene, are subjected to a controlled oxidation using molecular oxygen or a gas such as air which contains molecular oxygen with or without the aid of substances which have heretofore been employed and are known as free radical initiators. Such free radical initiators which may be employed may be represented, for example, by ozone, cumene hydroperoxide, dicumyl peroxide, benzoyl peroxide, azobis(isobutyronitrile) sodium persulfate, diethyl peroxydicarbonate, p-methane hydroperoxide, tertiary butyl hydroperoxide, nitric oxide ($N_2O_4$) and the like.

The present invention also contemplates the use of conventional oxidizing agents without the use of air. Such agents include, by way of example, nitric oxide ($N_2O_4$), peracids, peroxides, and the like.

The controlled oxidation may be carried out preferably, although not necessarily, in the presence of a suitable solvent such as benzene, chlorobenzene, tertiary butyl benzene, normal pentane, normal hexane, normal heptane or, when using a solvent which is not inert as those mentioned but which will itself be oxidized such as cumene, diisopropyl benzene, or Decalin; the starting material, i.e. material to be oxidized may be any one of the heretofore mentioned polymeric materials that have a viscosity average weight in excess of 100,000 and which contain at least 1, and preferably 7 tertiary carbon atoms per molecule, which tertiary carbon atoms contain a hydrogen atom directly connected thereto.

The solution is usually maintained at a temperature between about 40° and 150° C., preferably, between about 50° and 70° C., for a period of time ranging between about 1 hour and 24 hours, preferably, between about 2 hours and about 9 hours. It is found that the more vigorous the oxidation conditions and the longer the reaction period, the larger the amount of oxygen, e.g. in the form of hydroperoxide (HOO) radicals, introduced into the starting material.

The reaction conditions may be varied over considerable ranges and the correlation may be varied between the temperature of the reaction and the time of reaction. Generally, it is sufficient if at least 1 hydroperoxide radical (HOO) is introduced into each molecule of the starting material. The amount of oxygen introduced preferably ranges from about 1 to 50 millimoles of hydroperoxide groups (HOO) per 100 grams of polymeric product and, preferably, 2 to 20 millimoles, as determined iodometrically. It is conceivable that some of the oxygen introduced into the polymer molecule is introduced in the form of peroxides, peracids, and the like, in addition to the hydroperoxides introduced. As mentioned, in order to attain the desired utility of the final products produced, i.e. as additives in oleaginous compositions, it is expedient that a sufficient number of tertiary carbon atoms containing hydrogen atoms attached directly thereto are present in each molecule so that upon subsequent treatment of the resultant hydroperoxide modified polymer, a degradation or cleavage of the polymeric chains can be effected to substantially reduce the molecular weight of the original starting material.

In accordance with this invention, the hydroperoxidized material is subsequently reduced by contacting such material, while still in solution or suspension or as a solid, with a reducing agent. A suitable reducing agent is one which is capable of reaction with hydroperoxide groups on the polymer. Applicable methods for reducing the hydroperoxide groups include reaction with sodium sulfide, lithium aluminum hydride, sodium borohydride, tertiary phosphines, triethyl phosphite, hydrizin hydrate, aluminum amalgam, alkaline sodium sulfide, hydrogen iodide, zinc dust-acetic acid, and the like. Reaction with acids or alkali, as well as thermal treatment, may also remove active oxygen-containing groups, e.g. hydroperoxide groups from the oxidized polymer. Removal of these groups is desirable, since the polymer is less reactive after reduction and may be conveniently stored without further reaction taking place.

The final polymeric product may be recovered from solution by steam distillation of the solvent or by precipitation with acetone-methanol mixture (3:1) or by any other suitable method and is subsequently dried, for example, in a vacuum.

The product produced by the oxidation-reduction procedure is an oil-soluble product of lower molecular weight than the starting polymer, copolymer or terpolymer. The molecular weight depends on the extent and conditions employed during the oxidation and reduction. Ultimately, upon reduction of the hydroperoxidized polymers, hydroxylated and fragmented or degraded polymeric materials are formed which have viscosity average molecular weights of from about ⅓ to about ⅒ the molecular weight of the original material, i.e. have a viscosity average molecular weight of about 10,000 to about 150,000, preferably, 25,000 to 100,000. The amount of active oxygen-containing groups, groups containing oxygen as hydroxyl groups (OH) is essentially the same after reduction as prior to reduction and thus is in the range of from 1 to 50 millimoles preferably 2 to 20 millimoles per 100 grams of polymeric product. Examination of the polymers by the infrared spectroscopy shows that oxygenated groups introduced during a polymer oxidation are retained during reduction. Essentially no active oxygen in the form of hydroperoxides, peroxides or peracids, however, is detected after reduction by any of the preferred methods.

Illustrative of the foregoing, is an ethylene-propylene rubbery copolymer which is subjected to the aforementioned oxidation and subsequent reduction to yield polymeric fragmentation or degradation products containing hydroxyl groups with minor amounts of carboxyl, keto and aldehyde groups and having a viscosity average molecular weight ranging between about 20,000 and about 60,000.

Organic isocyanate compounds which are suitably employed to prepare the products of the present invention include, by way of example, aromatic, aliphatic, and heterocyclic isocyanates. For the utility disclosed herein the isocyanate is usually a monoisocyanate, but under some circumstances, a diisocyanate or polyisocyanate may be employed. In defining the isocyanates employed in this invention, therefore, it may be stated that any suitable organic radical may be bonded to an isocyanate group to form the organic isocyanate compound used in the process of the present invention including acyclic, alicyclic, aromatic and heterocyclic radicals. Suitable organic isocyanates are, therefore, the alkyl monoisocyanates which are more fully defined hereinafter, the alicyclic monoisocyanates such as, for example cyclohexyl isocyanate, chlorohexyl isocyanate, and the like; aromatic monoisocyanates such as phenyl isocyanate, and the like, etc. Particularly suitable for use in the present invention are the alkyl monoisocyanates, i.e. isocyanates having the formula R—NCO where R is an aliphatic hydrocarbon containing from about 10 to about 25 carbon atoms and preferably about 14 to about 20 carbon atoms. Nonlimiting examples of such isocyanates include tetradecyl-isocyanate, pentadecyl-isocyanate hexadecyl-isocyanate, heptadecyl-isocyanate, octadecyl-isocyanate, nonadecyl-isocyanate, eicosyl-isocyanate, and the like.

The amount of isocyanate reacted with the hydroxylated polymer will depend on the particular application to which the product will be applied but will be based on the equivalent amount required for reaction with each hydroxyl group of the polymer. The amount employed should be sufficient to have present in the total mass about one equivalent of the hydroxylated polymer. In other words, the amount of isocyanate compound employed must be such that there is the theoretical amount required to form a urethane linkage by reaction of each hydroxyl and isocyanate group. In accordance therewith, the amount of isocyanate employed may be in the broad range of from 0.5 to 2 equivalents per hydroxyl group, but will preferably be about 1 equivalent per hydroxyl group of the polymer. While the amount of polyisocyanate employed will vary with the number of active hydrogen atoms, i.e. hydroxyl groups, contained in the polymer, generally between about 2 to 25 percent by weight of polyisocyanate based on weight of polymer will produce a polyurethane product having suitable properties, with about 10 percent by weight of isocyanate based on weight of polymer being the amount most preferably employed.

The reaction of hydroxylated polymer groups per molecule (of which only one hydroxyl group is shown) with an alkyl isocyanate can be illustrated by the equation:

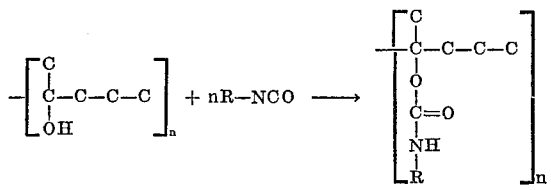

where R is as defined above.

The process for preparing the products of the invention broadly comprises mixing the organic isocyanate with the hydroxylated polymer, said hydroxyl groups being reactive with the isocyanate groups. There is no critical order of addition, reaction temperature or reaction time involved in this process. In order to minimize side reactions, however, it is desirable to maintain the temperature of the reactants below about 100° C. The exotherm of the reaction mixture is usually below about 100° C. and therefore no cooling of the reaction mixture is necessary.

In a preferred embodiment, additive compositions can be prepared by reaction of an organic isocyanate with the hydroxylated polymers as set forth above and, if desired, in an inert solvent, therefore said reaction mixture leading to the production of said composition. Any suitable inert organic solvent may be used such as, for example, xylene, ethyl acetate, toluene, ethene glycol monoethylether acetate, and the like.

The polymeric urethane compositions of this invention are employed as additives in concentrations of about 0.1 to about 10 wt. percent, preferably between about 0.5 and about 5.0 wt. percent based on the oleaginous composition being treated, so as to accomplish the desired objects. It is to be understood that such ranges are flexible and will be determined by the particular character of the oleaginous composition to which the additive is added. However, no more urethane polymer or terpolymer will be added than will be in solution in the oleaginous composition. Typically such additives are sold as concentrates when the additive is present in amounts of from 5 to 50 wt. percent, preferably 10 to 25 wt. percent, weight percent based on the total amount of the solvent employed for the additive, e.g., mineral oils, hexane, heptane and the like.

The urethane copolymers of the present invention can be employed alone in oleaginous compositions or, if desired, can be employed in combination with other viscosity index improvers in order to affect that characteristic of the base oleaginous composition. If desired, said polymers may be employed in combination with other additives for example, pour point depressant, detergent type additives, corrosion inhibitors, antioxidants, sludge inhibitors, metal deactivators, etc.

While the disclosure has been directed to an oleaginous composition comprised of a lubricating oil, it is to be understood that the present invention also contemplates that the additives defined herein may, if desired be employed with various other oleaginous compositions such as, for example, gasoline, middle distillate fuels, transformer oils, greases, etc.

The present invention also contemplates that the urethane polymers produced by the process described herein can be subjected to such after-treatment as may be desired to fit them for particular uses or to impart desired ancillary properties. It is to be understood, therefore, that the polymers utilized by the present invention can be subjected to chemical treatments, such as halogenation, halogenation followed by dehalogenation, sulfohalogenation by treatment with sulfuryl chloride, or mixtures of chlorine and sulfur dioxide, sulfonation, as well as any other reaction to which hydrocarbons may be subjected. In addition, it is also contemplated that said polymers can be blended with other copolymers or terpolymers so as to impart various desired properties thereto.

The following examples describe the invention more fully, both from a standpoint of the preparation of the polymers and of their advantageous use in typical oleaginous compositions.

Example 1

This example serves to illustrate preparation of a typical - ethylene - alpha - olefin copolymer which may be employed to prepare the urethane compositions of this invention.

An ethylene-propylene rubber prepared from 50 mole percent ethylene and 50 mole percent propylene and having a viscosity average molecular weight of 106,000 was dissolved in 300 grams of cumene over a period of about 5 hours at 60° C. To this polymer solution was added 10 grams of absolute methanol and 2.7 grams of cumene hydroperoxide. A stream of air containing 20 wt. percent oxygen was introduced into the reaction mixture. At the end of 7 hours, the product was analyzed and found to contain 4.01 millimoles of HOO per 100 grams of product. After isolation by precipitation with methanol, the product was redissolved in 450 ml. n-heptane and reduced at a temperature of 25° C. for about 7½ hours using 13 wt. percent aqueous solution of sodium sulfite which converted the hydroperoxide radicals into hydroxyl radicals. After precipitation and washing of the product, it was found to have a viscosity average molecular weight of 35,000.

Example 2

This example illustrates the preparation of a urethane polymer typical of the present invention and the subsequent use thereof.

In this experiment, 5 grams of a hydroxylated ethylene-propylene copolymer (HEP) prepared in a manner similar to that of Example 1 were dissolved in 100 milliliters of heptane. To this ethylene-propylene copolymer solution was added two drops of triethylamine and 3.0 grams of a $C_{16}$–$C_{18}$ monoisocyanate (TONCO 70). The reaction mixture was stirred at room temperature for 20 hours and then at reflux temperature for an additional 8 hours. The polymer was precipitated from methanol and dried in a vacuum oven.

In order to illustrate the advantageous improvement in thickening power, etc., the urethane polymer of the instant invention (Urethane) was compared with a hydroxylated ethylene-propylene copolymer (HEP) prepared similar to that in Example 1, but not reacted with an isocyanate. In this comparison 3.6 wt. percent of each polymer was added to separate portions of base oil, i.e., Barosa 43. The resulting data are as follows in Table I.

TABLE I

| 3.6 wt. percent Polymer in Barosa 43 [1] | K.V. (cs.) | | Thickening power [2] (SUS at 210° F.) | V.I. |
|---|---|---|---|---|
| | 100° F. | 210° F. | | |
| Urethane | 359.4 | 44.23 | 207.0 | 131 |
| HEP | 280.8 | 34.19 | 161.2 | 131 |

[1] Barosa 43: a mixed paraffinic and naphthenic oil of 5.46 cs. at 210° F.
[2] Thickening power: the viscosity of a Barosa 43 oil containing 2% polymer.

The foregoing data clearly indicate an impressive improvement in thickening potency of the additive of this invention, without adversely affecting V.I. improving characteristics.

Example 3

This example also serves to illustrate the preparation and use of a urethane polymer of this invention.

In this example the conditions of Example 2 were repeated, i.e. 5 grams of hydroxylated ethylene-propylene copolymer (HEP) prepared in a manner similar to that of Examples 1 and 2 were dissolved in 100 milliliters of heptane. To this ethylene-propylene copolymer solution was added two drops of triethylamine and 3.0 grams of a $C_{16}$–$C_{18}$ monoisocyanate (TONCO 70). The reaction mixture was stirred at room temperature for 20 hours and at reflux temperature for an additional 8 hours. The polymer was precipitated from methanol and dried in a vacuum oven.

In order to illustrate the thickening power, etc. characteristics, 3.6 wt. percent of the urethane polymer of the instant invention (Urethane) was compared with a hydroxylated ethylenepropylene copolymer (HEP) prepared similar to that in Example 1, but not reacted with an isocyanate. In this comparison 3.6 wt. percent of each polymer was also added to separate portions of base oil, Barosa 43. The resulting data are as follows in Table II.

TABLE II

| 3.6 wt. percent polymer in Barosa 43 | K.V. (cs.) | | Thickening power (SUS at 210° F.) | V.I. |
|---|---|---|---|---|
| | 100° F. | 210° F. | | |
| Urethane | 470.1 | 55.84 | 260.9 | 129 |
| HEP | 418.5 | 49.82 | 237.6 | 129.8 |

The foregoing data, as do the data of Table I, illustrate a marked improvement in thickening potency accruing from the copolymers of this invention.

What is claimed is:

1. An oleaginous composition comprising a major proportion of an oil selected from the group consisting of gasoline, middle distillate fuel, and lubricating oil, and from about 0.1 to about 10% by weight of the urethane reaction product obtained by treating (1) a hydroxylated polymer of ethylene and propylene obtained by oxidizing and reducing an ethylene-propylene polymer to produce a hydroxylated polymer containing 1 to 50 millimoles of combined oxygen per 100 grams of polymer, said hydroxylated polymer containing from about 20% to about 75% by weight of ethylene and having a viscosity average molecular weight within the range between about 50 and 500,000 with (2) from about 0.5 to about 2 equivalents per polymer hydroxy group of a $C_{10}$–$C_{25}$ hydrocarbon isocyanate.

2. The composition of claim 1 wherein said hydroxylated polymer contains from about 2 to about 20 millimoles of combined oxygen per 100 grams of polymer.

3. The composition of claim 1 wherein the hydroxylated polymer has a viscosity average molecular weight of between about 20,000 and 100,000.

4. The composition of claim 3 wherein the ethylene-propylene polymer contains up to 20% by weight of a third monomer comprising a $C_6$–$C_{15}$ nonconjugated diolefin.

5. The composition of claim 1 wherein the isocyanate is an aliphatic monoisocyanate having the formula R—NCO wherein R is an alkyl group containing from about 16 to 20 carbon atoms.

6. The composition of claim 1 wherein the oleaginous composition contains said urethane polymer in amounts of from about 0.5 to about 5.0 wt. percent based on said oleaginous composition.

References Cited

UNITED STATES PATENTS

| 2,781,319 | 2/1957 | Barnum et al. | 44—62 X |
| 2,837,496 | 6/1958 | Vandenberg | 252—51.5 |
| 2,901,458 | 8/1959 | Banes et al. | 252—56 |
| 2,987,515 | 6/1961 | Stromberg et al. | 252—51.5 X |
| 3,067,163 | 12/1962 | Bauer | 252—51.5 X |
| 3,088,931 | 5/1963 | Scanley et al. | 255—5.15 X |
| 3,096,285 | 7/1963 | Huttenlocher et al. | 252—51.5 X |
| 3,316,177 | 4/1967 | Dorer | 252—51.5 |

PATRICK P. GARVIN, *Primary Examiner.*